(12) United States Patent
Park et al.

(10) Patent No.: US 12,105,521 B2
(45) Date of Patent: *Oct. 1, 2024

(54) MOBILE ROBOT SYSTEM, AND METHOD FOR GENERATING BOUNDARY INFORMATION OF MOBILE ROBOT SYSTEM

(71) Applicant: LG ELECTRONICS INC., Seoul (KR)

(72) Inventors: Sungyeon Park, Seoul (KR); Jeongwoo Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 17/795,301

(22) PCT Filed: Oct. 29, 2020

(86) PCT No.: PCT/KR2020/014888
§ 371 (c)(1),
(2) Date: Jul. 26, 2022

(87) PCT Pub. No.: WO2021/153880
PCT Pub. Date: Aug. 5, 2021

(65) Prior Publication Data
US 2023/0085884 A1    Mar. 23, 2023

(30) Foreign Application Priority Data

Jan. 30, 2020   (KR) ........................ 10-2020-0011266

(51) Int. Cl.
*G05D 1/02*      (2020.01)
*A01D 34/00*      (2006.01)
(Continued)

(52) U.S. Cl.
CPC ......... *G05D 1/0276* (2013.01); *A01D 34/008* (2013.01); *A01D 2101/00* (2013.01)

(58) Field of Classification Search
CPC ...... G05D 1/0022; G05D 1/0044; G05D 1/02; G05D 1/0219; A01A 34/00; A01A 34/008; B25J 11/00; B25J 19/00; B25J 9/16
See application file for complete search history.

(56) References Cited

U.S. PATENT DOCUMENTS

2015/0328775 A1   11/2015   Shamlian et al.
2016/0100522 A1*   4/2016   Yamauchi ............ A01B 69/008
                                          701/25
(Continued)

FOREIGN PATENT DOCUMENTS

JP        2008-234404      10/2008
KR   10-2013-0014105      2/2013
(Continued)

OTHER PUBLICATIONS

International Search Report dated Feb. 2, 2021 issued in Application No. PCT/KR2020/014888.
(Continued)

*Primary Examiner* — Tan Q Nguyen
(74) *Attorney, Agent, or Firm* — KED & ASSOCIATES, LLP

(57) ABSTRACT

The present invention relates to a mobile robot system for autonomously traveling in a travel area, and a method for generating boundary information of the mobile robot system, the mobile robot system being characterized by comprising: a transmitter for transmitting a transmission signal including location information; and a mobile robot which moves and rotates on the basis of the separation distance to the transmitter and the angle with respect to the transmitter, and generates boundary information on a travel area by
(Continued)

using a movement path, wherein the transmitter moves along the periphery of the mobile robot and changes the separation distance and the angle to control the travel of the mobile robot.

18 Claims, 10 Drawing Sheets

(51) Int. Cl.
  *G05D 1/00* (2006.01)
  *A01D 101/00* (2006.01)

(56) References Cited

U.S. PATENT DOCUMENTS

| | | | |
|---|---|---|---|
| 2019/0163174 A1* | 5/2019 | Ko | G05D 1/028 |
| 2019/0163175 A1* | 5/2019 | Ko | G05D 1/0088 |

FOREIGN PATENT DOCUMENTS

| | | |
|---|---|---|
| KR | 10-1240259 | 3/2013 |
| KR | 10-2015-0047893 | 5/2015 |
| KR | 10-2016-0063140 | 6/2016 |
| KR | 10-2018-0080646 | 7/2018 |
| KR | 10-1898372 | 9/2018 |
| KR | 10-2019-0064253 | 6/2019 |

OTHER PUBLICATIONS

Korean Office Action dated May 14, 2021 issued in Application No. 10-2020-0011266.
Korean Office Action dated Apr. 7, 2021 issued in Application No. 10-2020-0011266.
Korean Office Action dated Jan. 1, 2022 issued in Application No. 10-2021-0076963.
Korean Office Action dated May 12, 2022 issued in Application No. 10-2021-0076963.
Korean Notice of Allowance dated Jul. 19, 2022 issued in Application No. 10-2021-0076963.
Korean Office Action dated Mar. 7, 2022 issued in Application No. 10-2021-0076963.
Korean Office Action dated Feb. 5, 2021 issued in Application No. 10-2020-0011266.
Korean Office Action dated Jul. 7, 2021 issued in Application No. 10-2021-0076963.

* cited by examiner

MOBILE ROBOT SYSTEM, AND METHOD FOR GENERATING BOUNDARY INFORMATION OF MOBILE ROBOT SYSTEM

CROSS-REFERENCE TO RELATED PATENT APPLICATIONS

This application is a U.S. National Stage Application under 35 U.S.C. § 371 of PCT Application No. PCT/KR2020/014888, filed Oct. 29, 2020, which claims priority to Korean Patent Application No. 10-2020-0011266, filed Jan. 30, 2020, whose entire disclosures are hereby incorporated by reference.

TECHNICAL FIELD

An embodiment of the present disclosure relates to a mobile robot system that autonomously drives in a driving region, and a method for generating boundary information of the mobile robot system.

BACKGROUND ART

In general, a mobile robot is a device that automatically performs a predetermined operation while driving by itself in a predetermined zone without a user's manipulation.

The mobile robot detects an obstacle located in the zone to perform an operation by moving closer to or away from the obstacle.

Such a mobile robot may include a mobile robot that mows the lawn on a ground surface of a region as well as a cleaning robot that performs cleaning while driving in the region.

In general, a mobile robot device may include a riding type device that mows the lawn or weeds the grass on the ground while moving according to a user's operation when the user rides on the device, and a walk-behind type or hand type device that mows the lawn while moving when the user manually pulls or pushes the device.

Such a mobile robot device is moved by the user's direct manipulation to mow the lawn, so there is an inconvenience in that the user must directly operate the device.

Accordingly, a mobile robot-type mobile robot device having an element capable of mowing the lawn in a mobile robot is being studied.

In the case of such a mobile robot for a lawn mower, since it operates outdoors rather than indoors, it drives over a wider region than a mobile robot that drives in an indoor environment.

In the case of indoors, the ground is monotonous, and factors such as terrain/features that affect driving are limited, but in the case of outdoors, there are various factors that affect driving, and the terrain is greatly affected.

In particular, since the mobile robot may drive in an unrestricted wide region due to the nature of an outdoor region, it is essential to set a driving region for the mobile robot to drive.

Therefore, in order to designate a driving region for the mobile robot to drive, it is essentially required to set a boundary region defining the driving region.

On the other hand, Korea Patent Registration No. 10-1898372 (publication date: Sep. 12, 2018) (hereinafter referred to as a prior art document) discloses a technology capable of detecting a separation distance between a cleaner body and a connection portion and a rotation angle of the cleaner body with respect to a rotation shaft of a moving wheel, and allowing the cleaner body to follow a user and move automatically according to the separation distance and the rotation angle.

However, in the prior art document, since the user is always located between the cleaner body and the connection portion, the user's body may cause a disturbance in the operation of a sensor, and a follow-up point is set on the basis of information on the separation distance and rotation angle, and thus, there is a high dependence on the separation distance and the rotation angle value.

Therefore, in the prior art document, the accuracy of the sensor may be lowered by the user's body, and in this case, the measured separation distance and rotation angle are also affected, and thus, there is a problem in that the accuracy of the operation is lowered.

DISCLOSURE OF INVENTION

Technical Problem

The present disclosure is intended to provide an embodiment of a mobile robot system capable of overcoming the problem of the related art as described above, and a method of generating boundary information of the mobile robot system.

Specifically, an aspect of the present disclosure is intended to provide an embodiment of a mobile robot system capable of increasing the accuracy of operation by removing hindrances that interfere with the transmission and reception of signals between devices so as not to interfere with the flow of signals and a method of generating boundary information of the mobile robot system.

Furthermore, another aspect of the present disclosure is intended to provide an embodiment of a mobile robot system capable of intuitively manipulating a mobile robot and thus easily manipulating the mobile robot even when the measurement values are inaccurate, and a method of generating boundary information of the mobile robot system.

In addition, still another aspect of the present disclosure is intended to provide an embodiment of a mobile robot system capable of facilitating the setting of a boundary region defining a driving region and a method of generating boundary information of the mobile robot system.

Solution to Problem

An embodiment of the present disclosure for solving the above-described problems is to change a separation distance between a mobile robot and a transmitter and an angle between the mobile robot and the transmitter using the transmitter so as to manipulate the driving of the mobile robot, and generate boundary information using a movement path of the mobile robot as a solution to the problem.

Specifically, a mobile robot system may include a transmitter that is portable and transmits a transmission signal including location information; and a mobile robot that moves and rotates based on a separation distance to the transmitter and an angle with respect to the transmitter, and generates boundary information of a driving region using a movement path, wherein the transmitter moves around the mobile robot to change the separation distance and the angle to manipulate the driving of the mobile robot.

An embodiment of a method of generating boundary information using a mobile robot system of the present disclosure may include receiving a transmission signal including location information from a transmitter moving around a mobile robot; measuring a plurality of measurement values required for the driving of the mobile robot based on the location information of the transmission signal, and driving the mobile robot according to the measurement values; and generating boundary information using a movement path that has been driven by the mobile robot.

Such an embodiment may be applied and implemented to a lawn mower robot, a control method of a lawn mower robot, a lawn mower robot system, a control system of a lawn mower robot, a method of controlling a lawn mower robot, a method of setting a boundary region of a lawn mower robot, a method of generating/obtaining boundary information of a lawn mower robot, and the like, and may also be applied and implemented to all mobile robots, systems of controlling a mobile robot, and methods of controlling a mobile robot, and the like, to which the technical concept of the above embodiment is applicable.

Advantageous Effects of Invention

An embodiment of a mobile robot system and a method of generating boundary information of the mobile robot system of the present disclosure may minimize interference with the flow of signals since a user is not located between a transmitter and a mobile robot, thereby having an effect capable of enhancing the accuracy of operation.

Furthermore, the user may intuitively manipulate the movement of the mobile robot using the transmitter, thereby having an effect capable of operating the mobile robot in a desired direction even when the measured distance and angle values do not match the actual values.

In addition, boundary information may be generated using a movement path driven by the mobile robot based on the user's manipulation, thereby having an effect capable of generating boundary information within a range desired by the user.

Moreover, boundary information may be generated by recognizing the coordinate information of the movement path, thereby having an effect capable of performing various driving control and information processing using the coordinate information.

Besides, the mobile robot system may be controlled in various and efficient ways, thereby having an effect capable of increasing the efficiency, usability, and utility of the mobile robot system.

MODE FOR THE INVENTION

Figure 1:
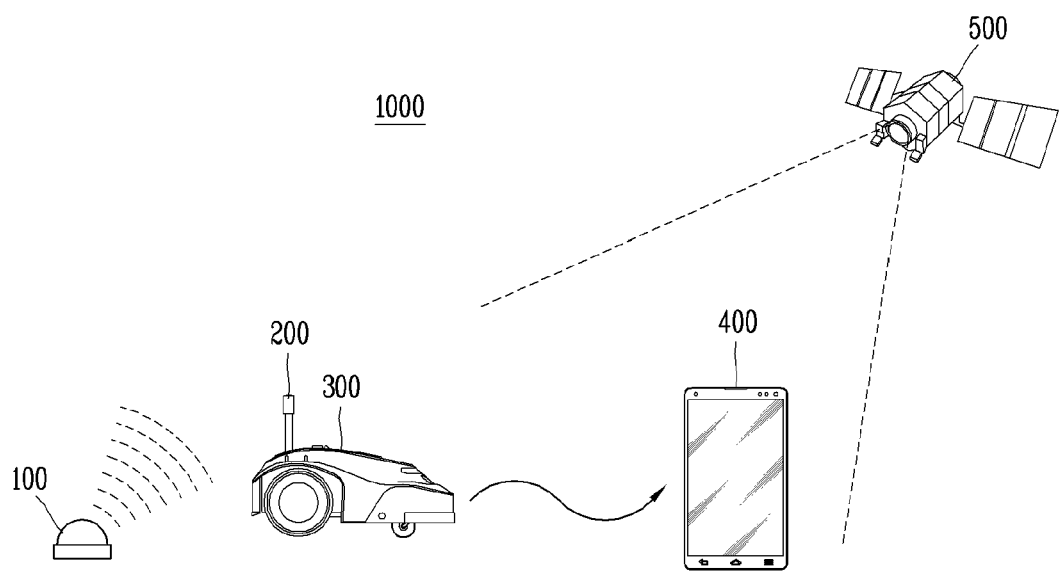
FIG. 1 is a conceptual view schematically showing a mobile robot system according to an embodiment.

Hereinafter, embodiments of a mobile robot system and a control method thereof will be described in detail with reference to the accompanying drawings, and the same or similar elements are designated with the same numeral references regardless of the numerals in the drawings and their redundant description will be omitted.

In describing the technology disclosed herein, moreover, the detailed description will be omitted when specific description for publicly known technologies to which the invention pertains is judged to obscure the gist of the technology disclosed in the present disclosure. Also, it should be noted that the accompanying drawings are merely illustrated to easily explain the concept of the technology disclosed in the present disclosure, and therefore, they should not be construed to limit the concept of the technology by the accompanying drawings.

Figure 2:
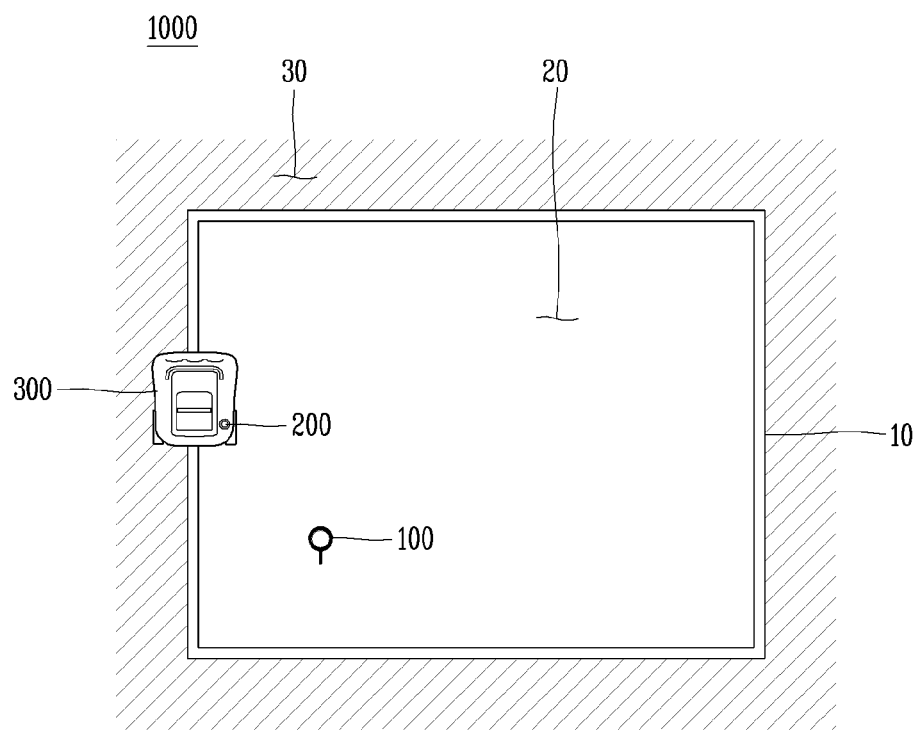
FIG. 2 is a conceptual view showing a driving principle of a mobile robot system according to an embodiment.

An embodiment of a mobile robot system 1000 according to the disclosure will be described with reference to FIGS. 1 and 2.

The mobile robot system 1000 includes a transmitter 100, a signal processing device 200, and a mobile robot 300.

The transmitter 100 is provided to be portable and transmits a transmission signal including location information. Furthermore, the transmitter 100 moves around the mobile robot 300 by a user to change a separation distance to and an angle with respect to the mobile robot 300 so as to manipulate the driving of the mobile robot 300. Here, the transmission signal may be transmitted in the form of a GPS signal, an ultrasonic signal, an infrared signal, an electromagnetic signal, or an Ultra-Wide Band (UWB) signal.

In an embodiment, the user may carry the transmitter 100 to change the separation distance and angle between the transmitter 100 and the mobile robot 300, thereby manipulating the mobile robot 300 to move and rotate in a desired direction. Furthermore, the user may manipulate the driving of the mobile robot 300 to generate boundary information on a boundary region 10 of a driving region 20 of the mobile robot 300.

Here, boundary information on the boundary region 10 is set using a movement path moved by the mobile robot 300, and the driving region 20 is defined by the boundary region 10 set by the movement path.

Furthermore, the boundary region 10 corresponds to a boundary line between the driving region 20 and an outer region 30, and the mobile robot 300 may perform driving in the driving region 20 without departing into the outer region 30 by the boundary region 10. In this case, the boundary region 10 may be defined as a closed curve or a closed loop.

The signal receiving device 200 is provided to communicate with the transmitter 100 and the mobile robot 300, and to be detachably attached to the mobile robot 300, and receives a transmission signal from the transmitter 100 to measure a separation distance to and an angle with respect to the transmitter 100.

The signal receiving device 200, which is a device distinguished from the mobile robot 300, has a configuration that is separate from the mobile robot 300. The signal receiving device 200 may be disposed on a rear side of the mobile robot 300, and may serve as a receiving element that receives a transmission signal from the mobile robot 200, and may correspond to an antenna.

Here, the signal receiving device 200 is not limited to a device distinguished from the mobile robot 200, and may be provided integrally with the mobile robot 300.

Figure 3:
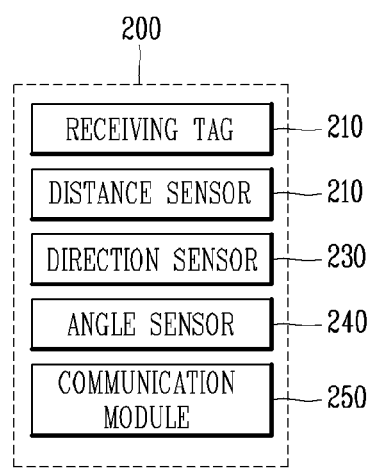
FIG. 3 is a conceptual view schematically showing a signal measuring device shown in FIG. 1.

Referring to FIG. 3, the signal receiving device 200 includes a receiving tag 210, a distance sensor 220, a direction sensor 230, an angle sensor 240, and a communication module 250.

The receiving tag 210 receives a transmission signal from the transmitter 100, the distance sensor 220 measures a separation distance to the transmitter 100 using the transmission signal, the direction sensor 230 detects a movement direction of the mobile robot 300, and the angle sensor 240 measures an angle between the mobile robot 300 and the transmitter 100.

Figure 4A:
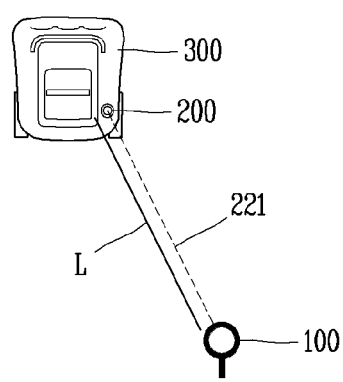
FIG. 4A is an exemplary view for explaining an operation in which a signal processing device according to an embodiment measures a distance to a transmitter.

Describing an operation in which the distance sensor 220 measures a separation distance to the transmitter 100 with reference to FIG. 4A, the distance sensor 220 sets a first virtual line 221 that is a virtual straight line with respect to the transmitter 100 to measure a distance L to the transmitter 100. Here, the first virtual line 221 is a virtual straight line indicating the shortest distance between the signal receiving device 200 and the transmitter 100.

Figure 4B:
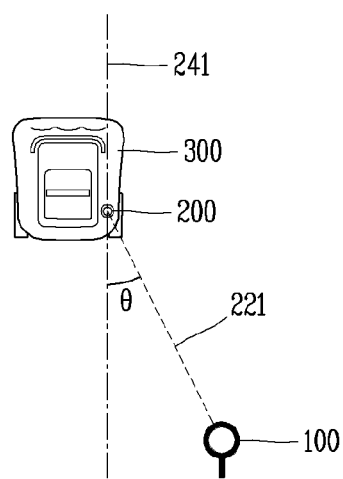
FIGS. 4B and 4C are exemplary views for explaining an operation in which a signal processing device according to an embodiment measures an angle with respect to a transmitter.
Figure 4C:
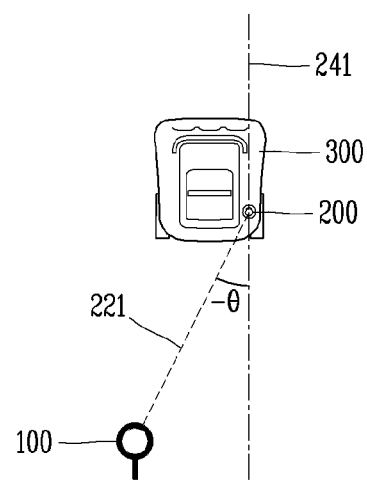

Describing an operation in which the angle sensor 240 measures an angle with respect to the transmitter 100 with reference to FIGS. 4B and 4C, the angle sensor 240 receives direction information on which the mobile robot 300 moves from the direction sensor 230, sets a second virtual line 241 corresponding to a movement direction of the mobile robot 300, and measures an angle (θ) formed between the mobile robot 300 and the transmitter 100 using an interior angle between the second virtual line 241 and the first virtual line 221. Here, the second virtual line 241 may be set based on the signal receiving device 200, but is not limited thereto.

Furthermore, the angle sensor 240 measures a first angle formed in a first direction from the first virtual line 221, and measures a second angle formed in a second direction from the first virtual line 221. The first direction and the second direction are opposite to each other, and the signs of the first angle and the second angle are opposite to each other.

For example, referring to FIG. 4B, when a right side with respect to the second virtual line 241 is referred to as a first direction, an angle formed on the right side of the second virtual line 241 becomes a first angle (θ). Then, as shown in FIG. 4C, a left side with respect to the second virtual line 241 becomes a second direction, an angle formed on the left side of the second virtual line 241 becomes a second angle (−θ), and when the sign of the first angle (θ) is plus (+), the sign of the second angle (−θ) is minus (−).

The mobile robot 300 may drive by itself within the driving region 20, and may perform a specific operation while driving. Here, the specific operation may be an operation of mowing the lawn in the driving region 20, and the driving region 20, which is a predetermined outside/outdoor region, may correspond to a garden or yard.

Furthermore, the mobile robot 300 moves and rotates based on a separation distance to the transmitter 100 and an angle with respect to the transmitter 100, and generates boundary information on the boundary region 10 of the driving region 20 using the movement path.

Specifically, the mobile robot 300 moves forward or stops according to the separation distance to the transmitter 100, and maintains the operation according to the angle with respect to the transmitter 100, or rotates in the first direction or the second direction.

Hereinafter, conditions under which the mobile robot 300 moves and rotates will be described.

Figure 5A:
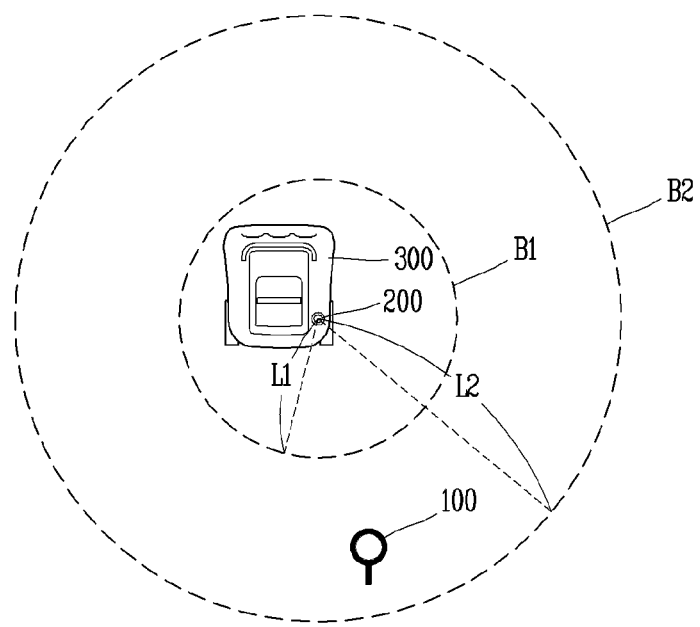
FIG. 5A is an exemplary view for explaining an operation in which a mobile robot according to an embodiment moves.

First, describing a condition in which the mobile robot 300 moves with reference to FIG. 5A, the mobile robot 300 moves forward when a distance to the transmitter 100 is above a first distance value L1, and below a second distance value L2.

For example, when the user carrying the transmitter 100 is located between a boundary line B1 of the first distance value L1 and a boundary line B2 of the second distance value L2 behind the mobile robot 200, the robot 300 moves forward.

Furthermore, when the user carrying the transmitter 100 moves toward the mobile robot 300 such that the distance to the mobile robot 300 approaches the boundary line B1 of the first distance value L1, or moves away from the mobile robot 300 such that the distance to the mobile robot 300 approaches the boundary line B2 of the second distance value L2, the mobile robot 300 reduces the speed.

Additionally, the speed at which the mobile robot 300 moves forward may be the maximum when the transmitter 100 is located at an intermediate position between the boundary line B1 of the first distance value L1 and the boundary line B2 of the second distance value L2, and may be the minimum when located on the boundary line B1 of the first distance value L1 or located on the boundary line B2 of the second distance value L2.

Describing a condition in which the mobile robot 300 stops, the mobile robot 300 stops when the distance to the transmitter 100 is less than the first distance value L1 or exceeds the second distance value L2.

For example, the mobile robot 300 stops when the user carrying the transmitter 100 moves toward the mobile robot 300 to move into the boundary line B1 of the first distance value L1, or moves out of the boundary line B2 of the second distance value L2 to move away from the mobile robot 300.

Figure 5B:
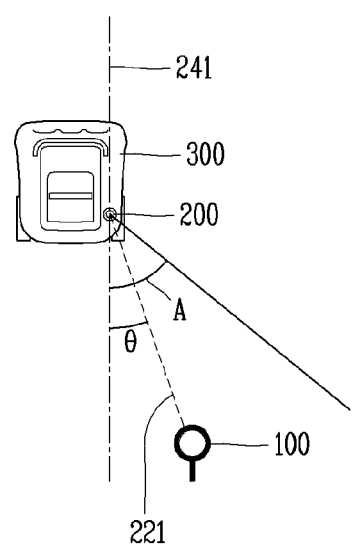
FIG. 5B is an exemplary view for explaining an operation in which a mobile robot according to the embodiment rotates.

A condition in which the mobile robot 300 rotates will be described with reference to FIG. 5B.

First, describing a condition of maintaining an operation of the mobile robot 300, the mobile robot 300 maintains a current operation when an absolute value of the angle (θ or −θ) formed between the first virtual line 221 and the second virtual line 241 is below a reference value A or above 90°.

Here, a current operation state of the mobile robot 300 may be a forward moving state or a stopped state.

Furthermore, describing a condition of rotating the mobile robot 300, the mobile robot 300 rotates when an absolute value of the angle (θ or −θ) exceeds the reference value A and is less than 90°.

In addition, the mobile robot 300 rotates in the first direction when the absolute value of the angle (θ or −θ) satisfies a rotation condition, and the angle (θ or −θ) is formed in the first direction of the second virtual line 241 such that the angle (θ) is positive, and rotates in the second direction when the angle (−θ) is formed in the second direction of the second virtual line 241 such that the angle (−θ) is negative.

For example, when the user carrying the transmitter 100 is located in the first direction of the mobile robot 300 such that the angle (θ) formed between the transmitter 100 and the mobile robot 300 indicates a positive value, and the absolute value of the angle (θ) is manipulated to have a value exceeding the reference value A but less than 90°, the mobile robot 300 rotates in the first direction.

On the contrary, when the user carrying the transmitter 100 is located in the second direction of the mobile robot 300 such that the angle ($\theta$) indicates a negative value, and the absolute value of the angle ($-\theta$) is manipulated to have a value exceeding the reference value A but less than 90°, the mobile robot 300 rotates in the second direction.

Additionally, the absolute value of the angle ($\theta$ or $-\theta$) formed between the transmitter 100 and the mobile robot 300 may increase as the absolute value increases from the reference value A to a right angle. For example, when the absolute value of the angle ($\theta$ or $-\theta$) has an intermediate value between the reference value A and the right angle, the robot 300 may rotate at 45°. Accordingly, as the user carrying the transmitter 100 manipulates a size of the angle ($\theta$ or $-\theta$), a rotation angle of the mobile robot 300 may also be manipulated.

Furthermore, the mobile robot 300 may perform an operation by applying a movement condition and a rotation condition at the same time. When a distance between the mobile robot 300 and the transmitter 100 is the first distance value L1 and below the second distance value L2, the mobile robot 300 moves forward, and in this state, when an absolute value of the angle ($\theta$ or $-\theta$) formed between the transmitter 100 and the robot 300 has a value exceeding the reference value A but less than 90°, the mobile robot 300 moves forward and rotates to correspond to the angle ($\theta$ or $-\theta$).

In addition, when a distance between the mobile robot 300 and the transmitter 100 is above the first distance value L1 or exceeds the second distance value L2, the mobile robot 300 stops, and in this state, when an absolute value of the angle ($\theta$ or $-\theta$) formed between the transmitter 100 and the robot 300 has a value exceeding the reference value A but less than a right angle, the mobile robot 300 rotates to correspond to the angle ($\theta$ or $-\theta$) in a stopped state.

In the above-described embodiment, the transmitter 100 has been described as being located behind the mobile robot 300, but is not limited thereto.

Furthermore, the mobile robot 300 generates boundary information on the boundary region 10 using a movement path that has been moved by driving through the above-described movement and rotation. The boundary region 10 may be set based on coordinate information on a map. In this case, the boundary region 10 is set as a virtual boundary line based on the coordinate information, and the mobile robot 300 may recognize the boundary region 10 by recognizing the virtual boundary line.

Furthermore, the mobile robot 300 may recognize the coordinate information of a plurality of rotation points on a movement path and generate boundary information on the boundary region 10 by connecting the coordinate information of the rotation points.

Here, the mobile robot 300 may generate boundary information by arranging the coordinate information corresponding to the rotation points on one coordinate plane and connecting the arranged points in a time sequential manner. In addition, the mobile robot 300 may store location information, and information on the boundary region 10, and the driving region 20.

A process of moving and rotating the mobile robot 300 according to the embodiment to generate boundary information will be described with reference to FIGS. 6A to 6F.

Here, a first direction is designated as a right side of the mobile robot 300, and a second direction is designated as a left side of the mobile robot 300. Therefore, an angle formed on the right side of the second virtual line 241 becomes the first angle ($\theta$), and an angle formed on the left side thereof becomes the second angle ($-\theta$).

Figure 6A:
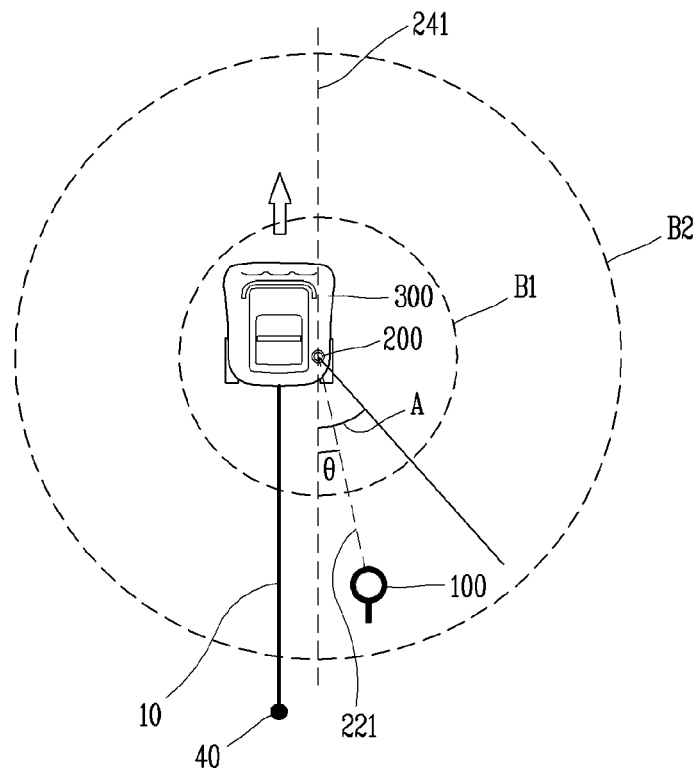
FIGS. 6A to 6F are exemplary views for explaining a process of manipulating a mobile robot according to an embodiment to generate boundary information.

Referring to FIG. 6A, when the transmitter 100 is disposed between the first distance value L1 and the second distance value L2 and the mobile robot 300 moves forward from a starting point 40, the mobile robot 300 recognizes the coordinate information of the starting point 40. Here, the transmitter 100 is disposed such that the first angle ($\theta$) with respect to the mobile robot 300 does not exceed the reference value A so as not to allow the mobile robot 300 to rotate.

An operation of rotating to the right at a point where the mobile robot 300 is located will be described with reference to FIG. 6B. Here, the mobile robot 300 rotates in a stopped state.

In order to stop the mobile robot 300, the transmitter 100 is moved into the boundary line B1 of the first distance value L1. Furthermore, when the first angle ($\theta$) formed between the transmitter 100 and the mobile robot 300 is manipulated to have a value exceeding the reference value A but less than 90°, the mobile robot 300 rotates to correspond to the first angle ($\theta$) in a stopped state.

Figure 6B:
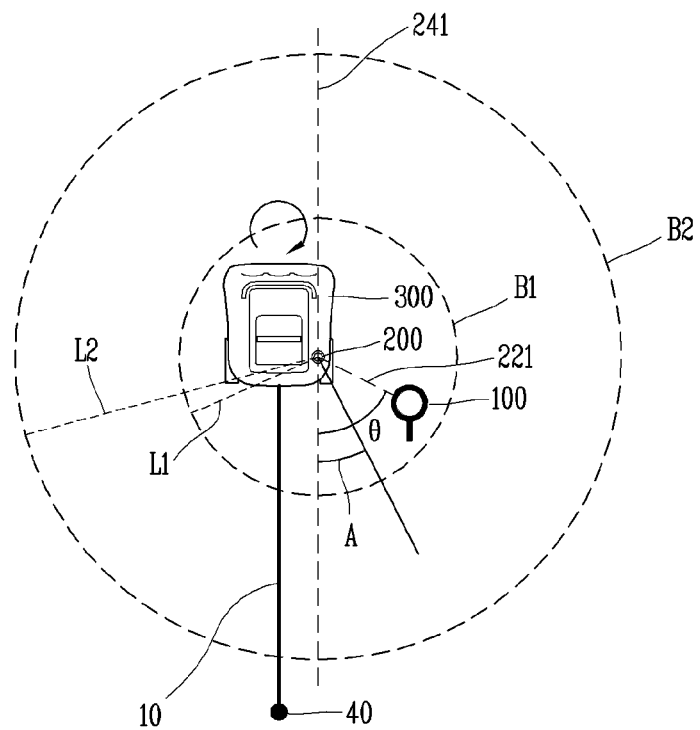
Figure 6C:
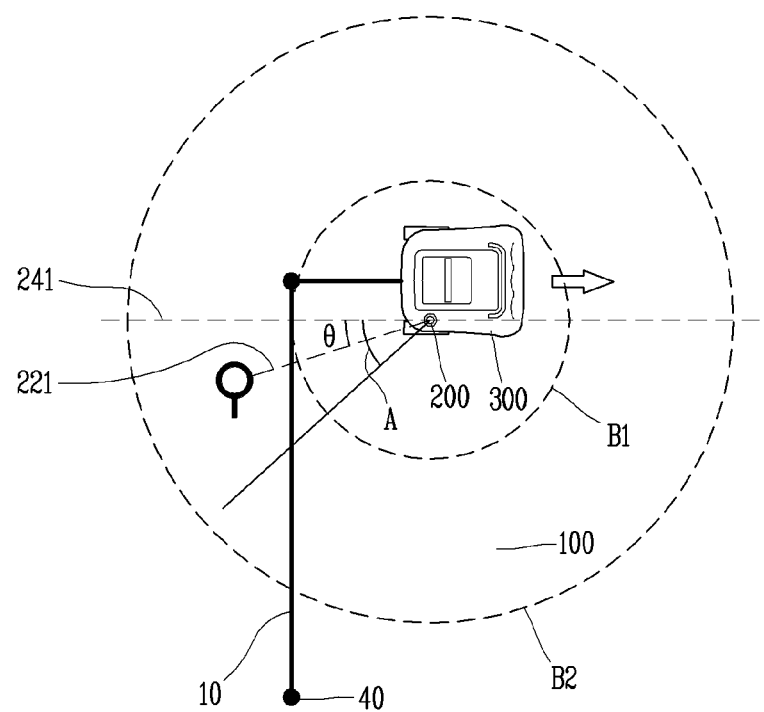

When the rotation of the mobile robot 300 is completed to an extent desired by the user in FIG. 6B, the transmitter 100 is moved out of the boundary line B1 of the first distance value L1 to allow the mobile robot 300 to move forward again as shown in FIG. 6C, and the first angle ($\theta$) formed between the transmitter 100 and the mobile robot 300 is made to have a value less than the reference value A to satisfy a condition in which the mobile robot 300 is able to move forward without rotating.

An operation of rotating the mobile robot 300 to the right at a point where the mobile robot 300 is located will be described with reference to FIG. 6B. Here, the mobile robot 300 rotates while moving forward.

Since the mobile robot 300 must move forward, the transmitter 100 is disposed between the boundary line B1 of the first distance value L1 and the boundary line B2 of the second distance value L2. Furthermore, when an absolute value of the second angle ($-\theta$) formed between the transmitter 100 and the mobile robot 300 is manipulated to have a value exceeding the reference value A but less than 90°, the mobile robot 300 rotates to correspond to the first angle ($\theta$) in a forward moving state.

Figure 6D:
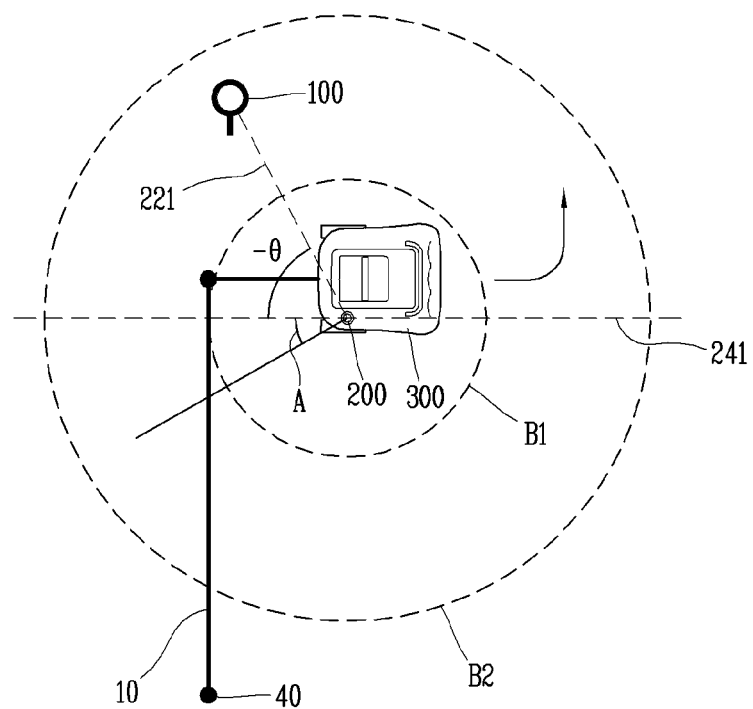
Figure 6E:
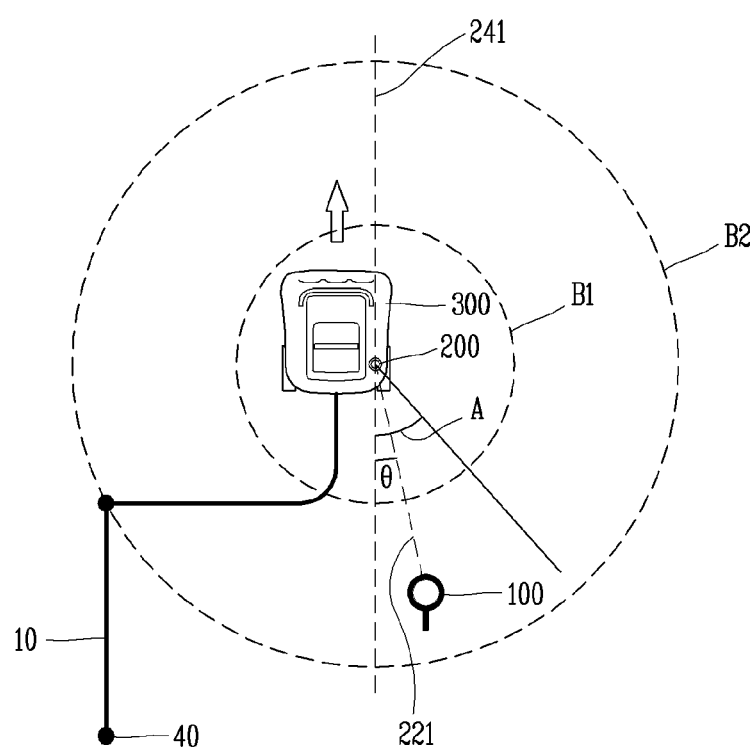

When the rotation of the mobile robot 300 is completed to an extent desired by the user in FIG. 6D, in order to stop the rotation of the mobile robot 300 as shown in FIG. 6E, an absolute value of the second angle ($-\theta$) formed between the transmitter 100 and the mobile robot 300 within a location that satisfies a condition in which the mobile robot 300 moves forward is made to be below the reference value A to satisfy a condition in which the mobile robot 300 maintains a moving forward or stopped operation.

Figure 6F:
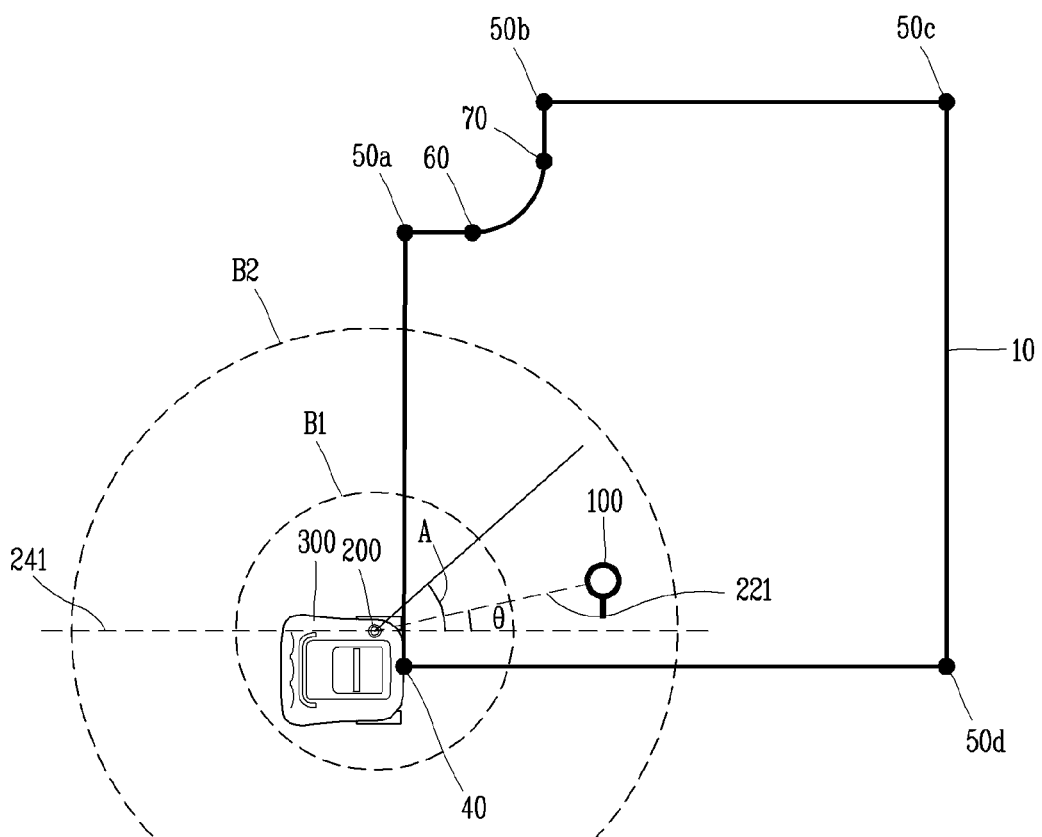

In this way, as shown in FIG. 6F, when the mobile robot 300 returns to the starting point 40 by performing the operations corresponding to FIGS. 6A to 6E described above, the mobile robot 300 generates boundary information on the boundary region 10 using the movement path.

Furthermore, the mobile robot 300 recognizes stationary rotation points 50a, 50b, 50c, 50d that are rotated while stopping as respective points to generate coordinate information, and recognizes points that are rotated while moving forward as a start point 60 and an end point 70 in a distinguished manner to generate coordinate information.

Then, when the mobile robot 300 returns to the starting point 40, the mobile robot 300 connects coordinate information on the stationary rotation points 50a, 50b, 50c, 50d and the start point 60 and the end point 70 of the points that are rotated while moving forward from the starting point 40 in a time sequential manner, and arrange them on one coordinate plane to generate boundary information on the boundary region 10.

Furthermore, a mobile robot system 1000 may further include a terminal 400 and a GPS satellite 500. The terminal 400 displays a control screen for controlling the operation of the mobile robot 300 on a display, and displays data received from the mobile robot 300 on the screen to monitor the operation of the mobile robot 300.

The GPS satellite 500 may transmit and receive a signal to and from at least one of the transmitter 100, the signal receiving device 200, and the terminal 400. The mobile robot 300 or the terminal 400 may determine a current location based on a GPS signal using the GPS satellite 500.

Figure 7:
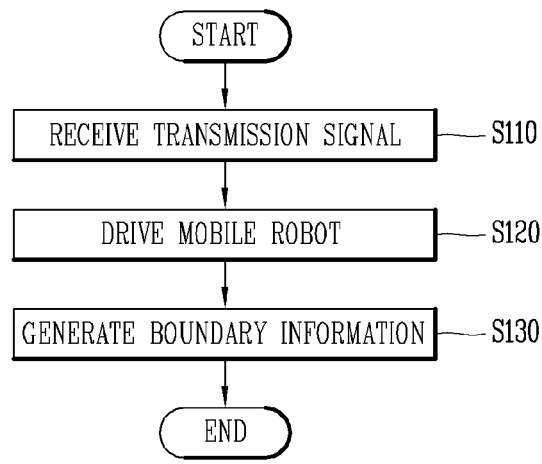
FIG. 7 is a flowchart showing a method of generating boundary information of a mobile robot system according to an embodiment.

A method of generating boundary information of a mobile robot system according to an embodiment will be described with reference to FIG. 7.

The method of generating boundary information of the mobile robot system according to the embodiment is a method of generating boundary information in the mobile robot system 1000 including the transmitter 100, the signal receiving device 200, and the mobile robot 300.

In the method of generating boundary information of the mobile robot system according to the embodiment, the signal receiving device 200 receives a transmission signal from the transmitter 100 (step S110).

The transmission signal may include location information, and the transmitter 100 that is portable may move around the mobile robot 300 by the user, and change the location of the transmission signal transmitted therefrom.

The mobile robot 300 drives based on a plurality of measurement values measured using the transmission signal (step S120).

The plurality of measurement values may be a separation distance between the mobile robot 300 and the transmitter 100 and an angle between the mobile robot 300 and the transmitter 100, and the measurement values are measured by the signal receiving device 200, and the separation distance and the angle are changed by the movement of the transmitter 100.

The mobile robot 300 generates boundary information based on a movement path (step S130).

In step S130, the mobile robot 300 may generate boundary information using the coordinate information of the movement path.

Furthermore, the mobile robot 300 may recognize the coordinate information of a plurality of rotation points 50a, 50b, 50c, and 50d, and connect the coordinate information of the rotation points to generate the boundary information.

Here, the mobile robot 300 generates the coordinate information of the start point 40, the stationary rotation points 50a, 50b, 50c, 50d that are rotated while stopping, the start point 60 and the end point 70 that are rotated while moving forward, and connects them in a time sequential manner and arrange them on one coordinate plane to generate boundary information on the boundary region 10.

Furthermore, the mobile robot 300 may store the collected location information, information on the boundary region 10 and the driving region 20.

Figure 8:
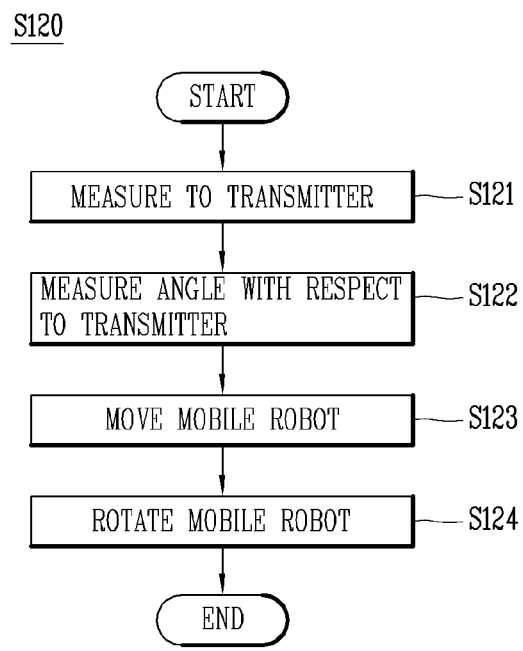
FIG. 8 is a flowchart showing a step in which the mobile robot shown in FIG. 7 drives.

A process (step S120) in which the mobile robot 300 drives will be described with reference to FIG. 8.

When the receiving tag 210 of the signal receiving device 200 receives a transmission signal from the transmitter 100 in step S110, The distance sensor 220 of the signal receiving device 200 measures a separation distance between the mobile robot 300 and the transmitter 100 using the transmission signal (step S121).

Describing a process in which the signal receiving device 200 measures a separation distance between the mobile robot 300 and the transmitter 100 in step S121, the distance sensor 220 of the signal receiving device 200 sets the first virtual line 221 with respect to the transmitter 100, measures a length L of the first virtual line 221 to measure a separation distance between the mobile robot 300 and the transmitter 100.

The angle sensor 240 of the signal receiving device 200 measures an angle ($\theta$ or $-\theta$) between the mobile robot 300 and the transmitter 100 using the transmission signal (step S122).

Describing a process in which the signal receiving device 200 measures an angle ($\theta$ or $-\theta$) between the mobile robot 300 and the transmitter 100 in step S122, the direction sensor 230 of the signal receiving device 200 detects a movement direction of the mobile robot 300, and the angle sensor 240 of the signal receiving device 200 receives the direction information of the mobile robot 300 from the direction sensor 230.

Then, the angle sensor 240 sets a second virtual line 241 corresponding to the movement direction of the mobile robot 300, and measures an angle ($\theta$ or $-\theta$) between the robot 300 and the transmitter 100 using an interior angle formed between the second virtual line 241 and the first virtual line 221.

Step S121 and step S122 may be performed simultaneously.

When the signal receiving device 200 transmits information about the separation distance L to the transmitter 100 and the angle ($\theta$ or $-\theta$) with respect to the transmitter 100 to the mobile robot 300, the mobile robot 300 moves to correspond to a movement condition according to the distance L (step S123), and the mobile robot 300 rotates to correspond to a rotation condition according to the angle ($\theta$ or $-\theta$) (step S124). Here, step S123 and step S124 may be performed simultaneously.

Describing a movement condition in which the mobile robot 300 moves in step S123 is described, the mobile robot 300 stops when the distance L between the mobile robot 300 and the transmitter 100 is less than the first distance value L1 or exceeds the second distance value L2, and the mobile robot 300 moves forward when the distance L is above the first distance value L1 and below the second distance value L2.

Describing a rotation condition in which the mobile robot 300 rotates in step S124, the mobile robot 300 maintains a moving forward or stopped operation when an absolute value of the angle ($\theta$ or $-\theta$) between the mobile robot 300 and the transmitter 100 is below the reference value A or above 90°, and rotates when the absolute value of the angle ($\theta$ or $-\theta$) exceeds the reference value A and is less than 90°.

Here, when the absolute value of the angle ($\theta$ or $-\theta$) satisfies the rotation condition, the mobile robot 300 rotates in the first direction when the angle ($\theta$) is positive, and rotates in the second direction when the angle ($-\theta$) is negative.

Accordingly, the mobile robot 300 may perform an operation of rotating in the first direction or the second direction while moving and stopping.

Although a specific embodiment according to the present disclosure has been described so far, various modifications may be made thereto without departing from the scope of the present disclosure. Therefore, the scope of the present disclosure should not be limited to the described embodiments and should be defined by the claims to be described later as well as the claims and equivalents thereto.

REFERENCE SIGNS LIST

100 . . . Transmitter; 200 . . . Signal receiving device
210 . . . Receiving tag; 220 . . . Distance sensor
230 . . . Direction sensor; 240 . . . Angle sensor
250 . . . Communication module; 300 . . . Mobile robot
400 . . . Terminal; 500 . . . GPS satellite

The invention claimed is:

1. A mobile robot system comprising:
   a transmitter that is portable and transmits a transmission signal including location information; and
   a mobile robot that moves and rotates based on a separation distance to the transmitter and an angle with respect to the transmitter, and generates boundary information of a driving region using a movement path,
   wherein the transmitter moves around the mobile robot to change the separation distance and the angle to manipulate driving of the mobile robot, and
   wherein the mobile robot moves forward or stops in response to the separation distance, and rotates in response to the angle.

2. The mobile robot system of claim 1, further comprising:
   a signal receiving device that receives the transmission signal, measures and transmits the separation distance and the angle to the mobile robot.

3. The mobile robot system of claim 2, wherein the signal receiving device is detachably attached to the mobile robot.

4. The mobile robot system of claim 2, wherein the signal receiving device comprises:
   a receiving tag that receives the transmission signal;
   a distance sensor that measures a distance to the transmitter;
   a direction sensor that detects a movement direction of the mobile robot;
   an angle sensor that measures an angle with respect to the transmitter; and
   a communication module that transmits measurement results of the distance sensor and the angle sensor to the mobile robot.

5. The mobile robot system of claim 4, wherein the distance sensor sets a first virtual line with respect to the transmitter, and measures a length of the first virtual line in order to measure the separation distance, and
   wherein the first virtual line is a virtual straight line between the transmitter and the mobile robot.

6. The mobile robot system of claim 5, wherein the angle sensor receives the movement direction from the direction sensor, and measures an angle with respect to the transmitter using an interior angle formed between the first virtual line and a second virtual line, and
   wherein the second virtual line is a virtual straight line corresponding to the movement direction.

7. The mobile robot system of claim 6, wherein the angle sensor measures a first angle formed in a first direction from the second virtual line, and measures a second angle formed in a second direction from the second virtual line, and
   wherein the first direction and the second direction are directions opposite to each other, and the signs of the first angle and the second angle are opposite to each other.

8. The mobile robot system of claim 7, wherein the mobile robot stops when the separation distance is less than a first distance value or exceeds a second distance value.

9. The mobile robot system of claim 7, wherein the mobile robot moves forward when the separation distance is above a first distance value, and below a second distance value.

10. The mobile robot system of claim 7, wherein the mobile robot maintains a moving forward operation or a stopped operation when an absolute value of the angle is below a reference value or above 90°.

11. The mobile robot system of claim 7, wherein the mobile robot rotates in a first direction or a second direction when an absolute value of the angle exceeds a reference value and is less than 90°.

12. The mobile robot system of claim 11, wherein the mobile robot rotates in a first direction when the angle is positive, and rotates in a second direction when the angle is negative, and
    wherein the first direction is a direction opposite to the second direction.

13. The mobile robot system of claim 1, wherein the mobile robot generates the boundary information using coordinate information of the movement path.

14. The mobile robot system of claim 1, wherein the mobile robot recognizes coordinate information of a plurality of rotation points, and connects the rotation points to generate the boundary information.

15. A method of generating boundary information of a mobile robot system, the method comprising:
    receiving a transmission signal including location information from a transmitter moving around a mobile robot;
    measuring a plurality of measurement values required for driving of the mobile robot based on the location information of the transmission signal, and driving the mobile robot according to the measurement values; and
    generating boundary information using a movement path that has been driven by the mobile robot,
    wherein the driving of the mobile robot comprises:
      measuring a separation distance to the transmitter;
      measuring an angle with respect to the transmitter;
      moving the mobile robot to correspond to a movement condition according to the separation distance; and
      rotating the mobile robot to correspond to a rotation condition according to the angle.

16. The method of claim 15, wherein the moving of the mobile robot to correspond to the movement condition includes the mobile robot stops when the separation distance is less than a first distance value or exceeds a second distance value, and the mobile robot moves forward when the separation distance is above the first distance value, and below the second distance value.

17. The method of claim 15, wherein the mobile robot maintains a moving forward operation or a stopped operation when an absolute value of the angle is below a reference value or above 90°, and
    wherein the mobile robot rotates in a first direction or a second direction when the absolute value exceeds the reference value and is less than 90°.

18. The method of claim 17, wherein the rotating of the mobile robot to correspond to the rotation condition includes the mobile robot rotates in the first direction when the angle is positive, and rotates in the second direction when the angle is negative.

* * * * *